United States Patent
Myrah et al.

(10) Patent No.: US 8,732,365 B2
(45) Date of Patent: May 20, 2014

(54) INPUT/OUTPUT SYSTEM AND METHODS TO COUPLE A STORAGE DEVICE TO THE SAME SERVER AFTER MOVEMENT IN AN INPUT/OUTPUT SYSTEM

(75) Inventors: Michael G. Myrah, Cypress, TX (US); Balaji Natrajan, Spring, TX (US); Pruthviraj Herur Puttaiah, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 94 days.

(21) Appl. No.: 13/154,611

(22) Filed: Jun. 7, 2011

(65) Prior Publication Data
US 2012/0317319 A1 Dec. 13, 2012

(51) Int. Cl.
G06F 3/00 (2006.01)
G06F 5/00 (2006.01)
G06F 13/38 (2006.01)

(52) U.S. Cl.
USPC .............................. 710/74; 710/37

(58) Field of Classification Search
USPC ...................................................... 710/37, 74
See application file for complete search history.

(56) References Cited

U.S. PATENT DOCUMENTS

| | | | |
|---|---|---|---|
| 5,812,821 A | 9/1998 | Sugi et al. | |
| 6,952,794 B2 | 10/2005 | Lu | |
| 7,228,364 B2 | 6/2007 | Ramsey et al. | |
| 7,644,168 B2 | 1/2010 | Grieff et al. | |
| 7,644,304 B2 | 1/2010 | Kotzur et al. | |
| 2009/0172468 A1 | 7/2009 | Abali et al. | |
| 2010/0036948 A1* | 2/2010 | Cassiday et al. | 709/225 |

* cited by examiner

*Primary Examiner* — Zachary K Huson

(57) ABSTRACT

In an embodiment, a method of operating a zone manager of an input/out system includes, in response to a storage device being inserted into a particular storage-device location of the input/output system, determining whether the particular storage-device location and the storage device are assigned to a same server of the input/output system, and assigning the particular storage-device location and storage device to the same server in response to determining that the particular storage-device location and the storage device are not assigned to the same server.

15 Claims, 6 Drawing Sheets

INPUT/OUTPUT SYSTEM AND METHODS TO COUPLE A STORAGE DEVICE TO THE SAME SERVER AFTER MOVEMENT IN AN INPUT/OUTPUT SYSTEM

BACKGROUND

Computers, such as personal computers, are often connected to data networks, such as the Internet, for accessing information stored on the data network. Servers are sometimes connected to a data network to enable several computers to access the information that is stored within the network. The information accessed by a server (e.g., that may be called an initiator) may be stored in a storage system that communicates with the server.

For example, a server may exchange information with the storage system using a particular protocol that defines the rules for exchanging information between the server and the storage system. An example of such a protocol is a SAS (Serial Attached SCSI (small computer serial interface)) protocol. A server may include a controller, such as an array controller, to couple the server to the storage system according to the particular protocol, such as the SAS protocol.

Some storage systems may include a storage array. A switch may facilitate communication between the server (the initiator) and the storage array using the particular protocol, such as the SAS protocol. For example, the switch may be referred to as a network switch (e.g., a SAS switch for storage systems that communicate with a server using the SAS protocol).

A storage array may include a plurality of storage locations, such as slots, e.g., that may be called bays. Each slot may be configured to receive a storage device (e.g., that may be called a target of the initiator), such as a disc drive, a tape drive, etc. For example, each slot may include a connector that connects, e.g., via hardwiring, a storage device to the switch. Some storage arrays may be contained in one or more storage enclosures.

Some storage systems may communicate with more than one server. For example, in response to user inputs, the switch may couple each server to a portion, such as a group (e.g., sometimes called a zone group), of the storage locations of the storage array. This may be referred to as zoning. An example of where a user might create a zone group assigned to a server may involve a bladed server, where the user might create a zone group for each server blade.

DETAILED DESCRIPTION

Figure 1:
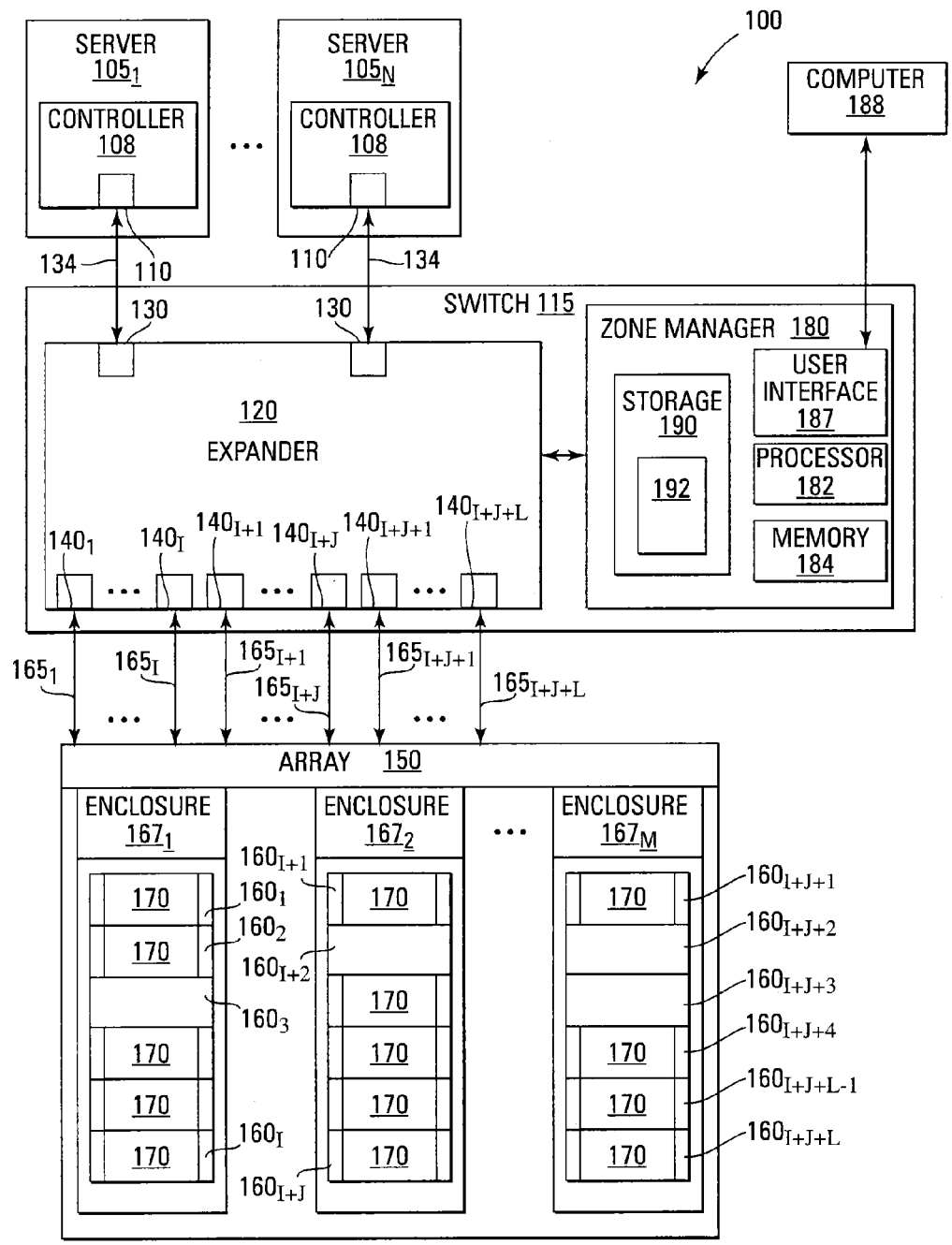
FIG. 1 is a block diagram of an input/output system, according to an embodiment.

In the following detailed description, reference is made to the accompanying drawings that form a part hereof, and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

FIG. 1 is a block diagram of an input/output (I/O) system 100 (e.g., that may be called a domain or a fabric). For example, I/O system 100 may be a SAS domain, e.g., a SAS fabric. Alternatively, I/O system 100 may be referred to as a service delivery system, such as a service delivery subsystem for some embodiments. I/O system 100 may be coupled to a data network, such as the Internet, a local area network (LAN), and/or a wide area network (WAN).

I/O system 100 may include a plurality of servers 105, such as servers $105_1$ to $105_N$. Servers 105 may be included in a bladed server, where each server 105 is a server blade located in an enclosure, such as a blade enclosure. Each server 105 may include a controller 108, such as an array controller.

Each controller 108 may provide one or more I/O ports 110 for its respective server 105. For some embodiments, each I/O port 110 may include a transceiver (e.g., that may be called a phys) that is configured to selectively transmit and selectively receive signals. For example, the signals herein may include electrical signals, wireless signals, and the like.

I/O system 100 may include a switch 115, such as a network switch, e.g., a SAS switch. Switch 115 may include an expander 120.

Expander 120, and thus switch 115, may be communicatively coupled to controllers 108, and thus servers 105. For example, communicative couplings may refer to hardwired electrical couplings, wireless couplings, optical couplings, magnetic couplings, and the like.

Expander 120 may include I/O ports 130 corresponding to respective ones of the one or more I/O ports 110 of each controller 108. Each I/O port 130 may include a transceiver (e.g., a phys) that is configured to selectively transmit and selectively receive signals.

Ports 130 may be communicatively coupled to respective ones of the one or more I/O ports 110 of each controller 108 by respective ones of links 134. For example, each link 134 in the example of FIG. 1 may include a pair of wires. When I/O ports 110 and 130 include transceivers, a port 110 may be configured to transmit a signal when a respective port 130 is configured to receive the transmitted signal and vice versa.

Expander 120 may include a plurality of I/O ports 140, such as I/O ports $140_1$ to $140_I$, $140_{I+1}$ to $140_{I+J}$, and $140_{I+J+1}$ to $140_{I+J+L}$. Each I/O port 140 may include a transceiver (e.g., a phys).

I/O system 100 may include an array 150 of storage-device locations 160, such as storage-device locations $160_1$ to $160_I$, $160_{I+1}$ to $160_{I+J}$, and $160_{I+J+1}$ to $160_{I+J+L}$ respectively corresponding to I/O ports $140_1$ to $140_I$, $140_{I+1}$ to $140_{I+J}$, and $140_{I+J+1}$ to $140_{I+J+L}$. For example, storage-device locations 160 may be slots for some embodiments and may be referred to as bays.

Storage-device locations $160_1$ to $160_I$, $160_{I+1}$ to $160_{I+J}$, and $160_{I+J+1}$ to $160_{I+J+L}$ may be communicatively coupled to respective ones of I/O ports $140_1$ to $140_I$, $140_{I+1}$ to $140_{I+J}$, and $140_{I+J+1}$ to $140_{I+J+L}$ by respective ones of links $165_1$ to $165_I$, $165_{I+1}$ to $165_{I+J}$, and $165_{I+J+1}$ to $165_{I+J+L}$. Each of links 165 may include a pair of wires, for example. Expander 120 may be configured to selectively couple ports 140, and thus storage-device locations 160, to ports 130, and thus to controllers 108 of servers 105.

For some embodiments, storage array 150 may be contained (e.g., housed) in one or more enclosures 167, such as enclosures $167_1$ to $167_M$. For example, storage-device locations $160_1$ to $160_I$ may be contained in enclosure $167_1$, storage-device locations $160_{I+1}$ to $160_{I+J}$ may be contained in enclosure $167_2$, and storage-device locations $160_{I+J+1}$ to $160_{I+J+L}$ may be contained in enclosure $167_M$. The respective enclosures 167 may be physically separated from each other, e.g., located in different portions of a room or located in different rooms.

A storage device 170, such as a disc drive, a tape drive, a SAS drive a SATA (serial advanced technology attachment) drive, etc., may be placed (e.g., inserted) in each of storage-device locations 160. Inserting a storage device 170 in a storage-device location 160 communicatively couples that storage device 170 to a respective port 140 of expander 120 through a respective link 165. For example, inserting a storage device 170 into storage-device location $160_1$ communicatively couples that storage device 170 to port $140_1$ of expander 120 through link $165_1$.

Each storage device 170 may include a transceiver (a phys). As such, inserting a storage device 170 into a storage-device location 160 communicatively couples the transceiver of that storage device 170 to a respective transceiver of a port 140 of expander 120. For example, inserting a storage device 170 into storage-device location $160_1$ communicatively couples the transceiver of that storage device 170 to the transceiver of port $140_1$ of expander 120. The transceiver of a port 140 may be configured to transmit a signal to the transceiver of a respective storage device 170 when the transceiver of the respective storage device 170 is configured to receive the transmitted signal and vice versa.

Switch 115 may transmit information between servers 105 and storage devices 170. For example, for embodiments where switch 115 is a SAS switch, switch 115 may transmit information between servers 105 and storage devices 170 using the SAS protocol.

I/O system 100 may include a controller, such as a zone manager 180. For some embodiments, zone manager 180 may be included in switch 115, as shown in FIG. 1. Zone manager 180 may include a processor 182 for processing processor-readable (e.g., computer-readable) instructions. These processor-readable instructions may be stored in a memory 184, such as a non-transitory computer-usable medium, and may be in the form of software, firmware, hardware, or a combination thereof. The processor-readable instructions may configure memory 184 to allow zone manager 180, and thus I/O system 100, to perform the various methods disclosed herein. In other words, zone manager 180 may be configured to perform the various methods disclosed herein.

In a hardware solution, the processor-readable instructions may be hard coded as part of processor 182, e.g., an application-specific integrated circuit (ASIC) chip. In a software or firmware solution, the instructions may be stored for retrieval by the processor 182. Some additional examples of non-transitory computer-usable media may include static or dynamic random access memory (SRAM or DRAM), read-only memory (ROM), electrically erasable programmable ROM (EEPROM or flash memory), magnetic media and optical media, whether permanent or removable. Some consumer-oriented computer applications are software solutions provided to the user in the form of downloads, e.g., from the Internet, or removable computer-usable non-transitory media, such as a compact disc read-only memory (CD-ROM) or digital video disc (DVD).

Zone manager 180 may include a user interface 187, such as a graphical user interface (GUI), a command-line interface (CLI), etc. User interface 187 may be communicatively coupled (e.g., either directly or through a network, such as a LAN) to an I/O device, such as a computer 188. In some embodiments, zone manager 180 may be integrated in computer 188, e.g., as software.

In general, zone manager 180 may be configured to assign any one of ports 140 and the storage-device location 160 coupled to that port 140 to any one of servers $105_1$ to $105_N$. For example, expander 120 may selectively couple any one of ports 140 and the storage-device location 160 coupled to that port 140 to any one of servers $105_1$ to $105_N$ in response to instructions from zone manager 180.

For some embodiments, the processor-readable instructions configure memory 184 to allow zone manager 180 to assign ports 140 to groups of ports, such as zone groups, where each group of ports 140 corresponds (e.g., is selectively coupled) to a server 105. For example, a zone group including ports $140_1$ to $140_I$ and port $140_{I+J+1}$ may be assigned to server $105_1$ and a zone group including ports $140_{I+1}$ to $140_{I+J}$ and port $140_{I+J+L}$ may be assigned to server $105_N$. For purposes of the example in FIG. 1, the remaining ports between ports $140_{I+J+1}$ to $140_{I+J+L}$ are not assigned to a zone group.

Each zone group may include the storage-device locations 160 coupled to the ports 140 of the respective zone group. For example, the zone group including ports $140_1$ to $140_I$ and port $140_{I+J+1}$ may include the storage-device locations $160_1$ to $160_I$ and storage-device location $160_{I+J+1}$ respectively coupled to ports $140_1$ to $140_I$ and port $140_{I+J+1}$ and the zone group including ports $140_{I+1}$ to $140_{I+J}$ and port $140_{I+J+L}$ may include the storage-device locations $160_{I+1}$ to $160_{I+J}$ and storage-device location $160_{I+J+L}$ respectively coupled to ports $140_{I+1}$ to $140_{I+J}$ and port $140_{I+J+L}$. For purposes of the example of FIG. 1, the remaining storage-device locations between storage-device location $160_{I+J+1}$ and storage-device location $160_{I+J+L}$, e.g., storage locations $160_{I+J+2}$ to $160_{I+J+L-1}$, are not assigned to a zone group. The storage devices 170 inserted in the storage-device locations 160 assigned to a certain zone group are assigned to that certain zone group.

The storage-device locations $160_3$, $160_{I+2}$, $160_{I+J+2}$, and $160_{I+J+3}$ do not contain a storage device 170, and are thus empty. Note that storage-device locations $160_3$ and $160_{I+2}$ are empty storage-device locations belonging to zone groups respectively assigned to servers $105_1$ and $105_N$, whereas storage-device locations $160_{I+J+2}$ and $160_{I+J+3}$ are empty locations that are not assigned to any zone groups.

The storage devices 170 in each zone group may be uniquely accessible to the server 105 of that zone group, and, therefore, those storage devices 170 may be assigned to that server 105. That is, the controller 108 of a server 105 may be configured, e.g., by a user, to have access rights to the storage devices 170 of a certain zone group. A server 105 of one zone group might not have access rights to the storage devices 170 of another zone group.

Each storage device 170 may include a unique identifier, such as the serial number of the respective storage device. For some embodiments, zone manager 180 is configured to assign storage devices 170, and a server 105 with access rights to those storage devices, to the same zone group based on the identifiers of those storage devices 170. For example, zone manager 180 may include storage 190, such as a hard drive, removable flash memory, etc., that may store an updateable table (e.g., a look-up table) 192 configured to map (assign) the identifier of each storage device 170 to a particular zone group and thus a particular server. Table 192 may also map (assign) storage-device locations 160 selectively coupled to a server 105 to a particular zone group.

In response to a storage device 170 being inserted in a particular location 160, a signal may be sent from storage array 150 to zone manager 180. For example, this may be referred to as a broadcast event, e.g., triggered in response to the storage device 170 being inserted into the particular storage-device location 160. For some embodiments, the signal may be sent to expander 120, e.g., over the link 165 corresponding to the particular storage-device location 160, which may in turn send the signal to zone manager 180.

Zone manager 180 may then retrieve the identifier of the storage device 170 from the storage device 170 and the storage-device location 160 from array 150 in response to receiving the signal. For example, this may be referred to as a discovery process performed by zone manager 180, where the discovery process may be triggered in response to receiving the signal, e.g., in response to the broadcast event.

At this point, zone manager 180 may enter look-up table 192 with the retrieved identifier of the storage device and the retrieved storage-device location and may take a particular action as described in the examples below. For example, zone manager 180 may determine from table 192 whether the identifier of the storage device and the storage-device location are assigned to the same zone group and thus the same server. Note that when one or more operations are performed in response to an event, such as receiving a signal, without user intervention, the one or more operations may be taken as being performed automatically for some embodiments.

In the following examples, N=2 so that there are servers $105_1$ and $105_2$, M=3 so that there are enclosures $167_1$, $167_2$, and $167_3$, and I=J=L=4 so that there are storage-device locations $160_1$ to $160_4$ in enclosure $167_1$, storage device locations $160_5$ to $160_8$ in enclosure $167_2$, and storage device locations $160_9$ to $160_{12}$ in enclosure $167_3$. This is shown in the examples of FIGS. 2A-2H.

Figure 2A:
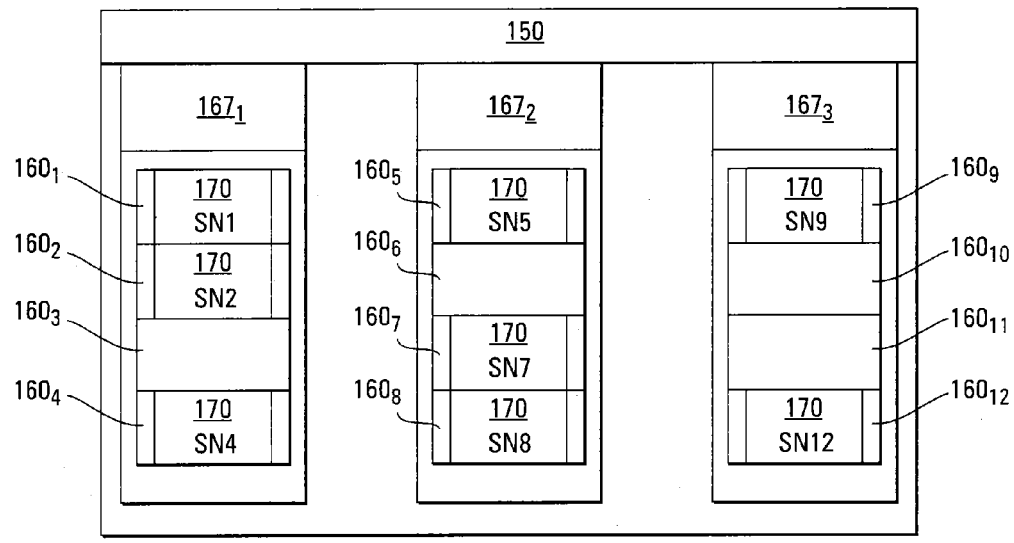
FIGS. 2A-2H are block diagrams of a storage array in different example configurations, according to another embodiment.

The example of FIG. 2A illustrates a configuration of storage array 150 where storage-device locations $160_1$, $160_2$, and $160_4$ respectively contain storage devices 170 with identifiers SN1, SN2, and SN4, storage-device locations $160_5$, $160_7$, and $160_8$ respectively contain storage devices 170 with identifiers SN5, SN7, and SN8, storage-device locations $160_9$ and $160_{12}$ respectively contain storage devices 170 with identifiers SN9 and SN12, and the remaining storage-device locations $160_3$, $160_6$, $160_{10}$, and $160_{11}$ are empty.

Table 1 shows an example of table 192, corresponding to the configuration of storage array 150 shown in the example of FIG. 2A.

TABLE 1

| Zone Group | Server | Storage-Device Locations | Storage-Device Identifiers |
| --- | --- | --- | --- |
| ZG1 | $105_1$ | $160_1$, $160_2$, $160_3$, $160_4$, $160_9$ | SN1, SN2, SN4, SN9 |
| ZG2 | $105_2$ | $160_5$, $160_6$, $160_7$, $160_8$, $160_{12}$ | SN5, SN7, SN8, SN12 |

Server $105_1$ has access rights to the storage devices 170 with identifiers SN1, SN2, SN4, and SN9 so that server $105_1$ and the storage devices 170 with identifiers SN1, SN2, SN4, and SN9 are assigned to zone group ZG1 and thus server $105_1$. The storage-device locations $160_1$, $160_2$, $160_4$, and $160_9$ that respectively contain storage devices 170 with identifiers SN1, SN2, SN4, and SN9 are assigned to zone group ZG1 and thus server $105_1$. Empty storage-device location $160_3$ is also assigned to zone group ZG1 and thus server $105_1$.

Server $105_2$ has access rights to the storage devices 170 with identifiers SN5, SN7, SN8, and SN12 so that server $105_2$ and the storage devices 170 with identifiers SN5, SN7, SN8, and SN12 are assigned to zone group ZG2 and thus server $105_2$. The storage-device locations $160_5$, $160_7$, $160_8$, and $160_{12}$ that respectively contain storage devices 170 with identifiers SN5, SN7, SN8, and SN12 are assigned to zone group ZG2 and thus server $105_2$. Empty storage-device location $160_6$ is also assigned to zone group ZG2 and thus server $105_2$. Empty storage-device locations $160_{10}$ and $160_{11}$ are not assigned to any zone group or server. Note that the storage device locations and storage devices that are assigned to the same zone group are also assigned to the same server.

In view of the foregoing, a zone group is a group of storage devices 160 assigned to a particular server 105 and a group of storage-device locations 160 assigned (e.g., selectively coupled) to the particular server 105. The storage devices 170 assigned to a particular server 105 are those storage devices 170 to which the particular server 105 has access rights. The storage-device locations 160 and storage devices 170 assigned to the same server 105 belong to the same zone group. For example, the identifiers and storage locations that are assigned to a zone group are also assigned the server of that zone group, e.g., the identifiers and storage locations that are assigned to zone group ZG1 are assigned to server $105_1$, and the identifiers and storage locations that are assigned to zone group ZG2 are assigned to server $105_2$.

The processor-readable instructions may configure memory 184 of zone manager 180 to allow zone manager 180 to track a storage device 170 within storage array 150 by the identifier SN of that storage device 170. For example, zone manager 180 may be configured to keep track of whether the identifier of a storage device 170 and the storage-device location 160 into which the storage device 170 is inserted are assigned to the same zone group and thus the same server.

The processor-readable instructions may configure memory 184 of zone manager 180 to allow zone manager 180 to make corrections when a storage device 170 with an identifier assigned to one zone group, and thus a particular server 105, is placed (e.g., by mistake) in a storage-device location 160 assigned to a different zone group, and thus a different server 105, thereby advantageously avoiding an error in the particular server 105. In other words, zone manager 180 may be configured to assign a storage device 170 and a storage-device location 160 into which the storage device 170 is inserted to the same zone group, and thus the same server 105, in response to determining that the storage device 170 and a storage-device location 160 into which the storage device 170 is inserted were assigned to different zone groups, and thus different servers, during tracking.

Note that a server 105 may be configured to indicate an error in the event it cannot access a storage device 170 that was previously assigned to that server 105, e.g., when that server 105 is powered up, due to that storage device 170 being misplaced in a storage-device location 160 assigned to a different server 105. By assigning a storage device 170 and a storage-device location 160 into which the storage device 170 is inserted to the same server 105, in response to determining that the storage device 170 and the storage-device location 160 into which the storage device 170 is inserted were assigned to different servers during tracking, the error is avoided.

For example, inserting a storage device 170 with an identifier assigned to one zone group, and thus one server 105, in a storage-device location 160 assigned to a different zone group, and thus a different server 105, may be referred to as an illegal storage device (e.g. drive) movement. For some embodiments, zone manager 180 may be configured to provide an indication in interface 187 that an illegal storage device movement was detected and corrected, e.g., by assigning the identifier and the storage-device location 160 to the same zone group, and thus the same server.

Zone manager 180 may send a signal to interface 187 indicative of the detection of the illegal movement in response to determining that the identifier of the storage device 170 and the storage-device location 160 are assigned to different zone groups, and thus different servers. Zone manager 180 may also send a signal to interface 187 indicative of the correction of the illegal movement in response to zone manager 180 assigning the identifier and the storage-device location 160 to the same zone group and thus the same server.

By tracking a storage device 170 and correcting for illegal movement of that storage device 170, zone manager 180 may ensure that that storage device 170 is coupled to the same server 105 regardless of where in array 150 that storage device 170 is moved and regardless of the storage-device location 160 into which that storage device 170 is inserted. Therefore, zone manager 180 is advantageously configured to cause storage devices 170 to remain coupled to the same server after movement in I/O system 100.

An identifier and a storage-device location 160 into which the storage device 170 with that identifier is inserted may be assigned to different zone groups, and thus different servers, when the identifier is not assigned to a server and the storage-device location 160 is assigned to a server, when the identifier is assigned to a server and the storage-device location 160 is not assigned to a server, or when the identifier is assigned to one server and the storage-device location 160 is assigned to different server. A correction may include assigning the identifier and the storage-device location 160 into which the storage device 170 with that identifier is inserted to the same zone group and thus the same server.

Figure 3:
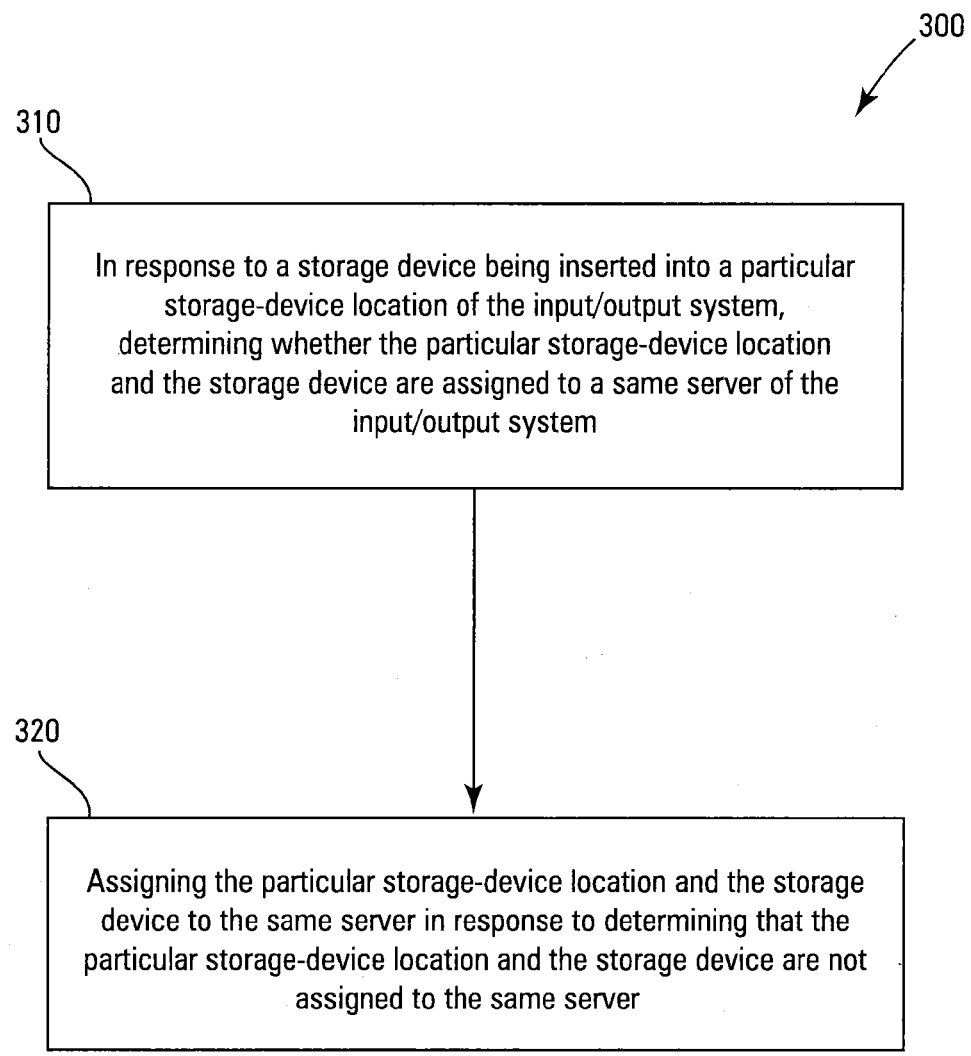
FIG. 3 is a flowchart of a method, according to another embodiment.

For one embodiment, the processor-readable instructions may configure memory 184 of zone manager 180 to allow zone manager 180, and thus I/O system 100, to perform a method 300, as illustrated by the flowchart in FIG. 3. In other words, zone manager 180 is configured to perform method 300.

In block 310, in response to a storage device being inserted into a particular storage-device location of I/O system 100, zone manager 180 determines whether the particular storage-device location and the storage device are assigned to a same server of I/O system 100. For example, this may be referred to as tracking the storage device. In block 320, zone manager 180 assigns the particular storage-device location and the storage device to the same server in response to determining that the particular storage-device location and the storage device are not assigned to the same server. For example, this may be referred to as a correction.

Figure 2B:
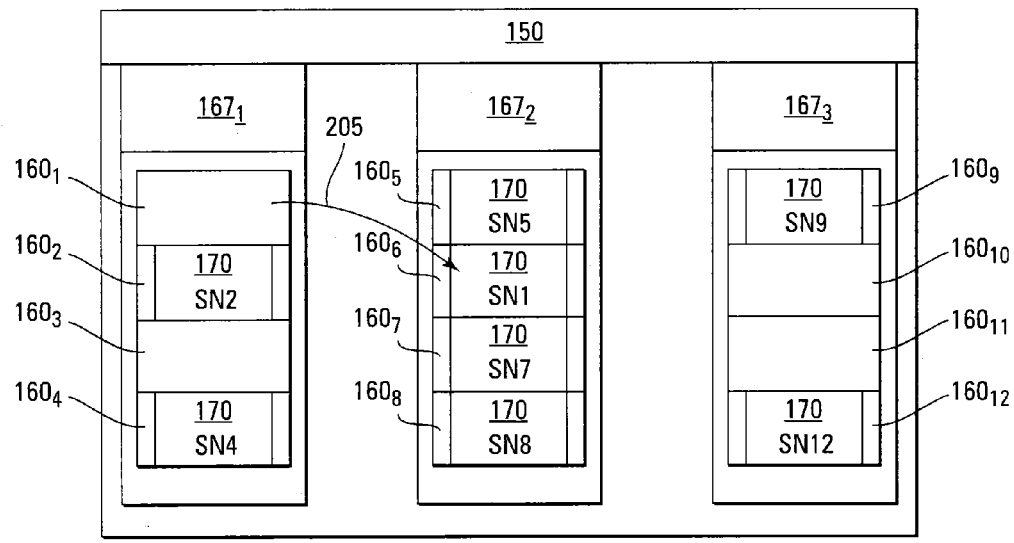

In the example of FIG. 2B, the storage device 170 with identifier SN1 is moved from storage-device location $160_1$ of storage array 150 to the empty storage-device location $160_6$, as indicated by arrow 205. In response to the storage device 170 with identifier SN1 being inserted in storage-device location $160_6$, a signal (e.g., referred to as a broadcast event) may be sent from storage array 150 to zone manager 180, e.g., over the link 165 corresponding storage-device location $160_6$ and through expander 120. Zone manager 180 may then retrieve identifier SN1 from the storage device 170 and the storage-device location $160_6$ from array 150 (e.g., referred to as a discovery process) in response to receiving the signal and may enter Table 1 with the retrieved identifier SN1 and the retrieved storage-device location $160_6$.

Zone manager 180 may then determine the zone group and the server corresponding to identifier SN1 (in this case zone group ZG1 and thus server $105_1$) in response to entering Table 1 with the retrieved identifier SN1. Zone manager 180 may also determine the zone group and the server corresponding to the storage-device location $160_6$ (in this case zone group ZG2 and thus server $105_2$) in response to entering Table 1 with the retrieved storage-device location $160_6$. In other words, zone manager 180 may determine the server (e.g., server $105_1$) to which identifier SN1 is assigned using the retrieved identifier SN1 and the server (e.g., server $105_2$) to which the storage-device location $160_6$ is assigned using the retrieved storage-device location. Zone manager 180 may then compare the zone groups, and thus the servers, thus obtained to determine whether the zone group, and thus the server, corresponding to storage-device location $160_6$ and the zone group, and thus the server, corresponding to identifier SN1 are the same or different. For example, this may be referred to as automatically tracking the storage device 170 with identifier SN1.

In the example of FIG. 2B, the comparison of the zone groups thus obtained reveals that storage-device location $160_6$ and the identifier SN1 are assigned to different zone groups, i.e., respectively to zone groups ZG2 and ZG1. For example, this may be referred to as automatically detecting an illegal storage device movement. In other words, storage-device location $160_6$ and the storage device 170 with identifier SN1 are assigned to different servers, i.e., respectively servers $105_2$ and $105_1$. Therefore, zone manager 180 may assign storage-device location $160_6$ to the same zone group ZG1, and thus server $105_1$, as identifier SN1 so that the storage device 170 with identifier SN1 remains coupled to server $105_1$, thereby advantageously avoiding an error in server $105_1$. For example, this may be referred to as an automatic correction to the illegal storage device movement.

If storage-device location $160_6$ is not assigned to zone group ZG1, and thus server $105_1$, but instead remains assigned to zone group ZG2, and thus server $105_2$, the storage device 170 with identifier SN1 would be coupled to server $105_2$. This would result in server $105_1$ issuing an error signal, in that server $105_1$ would no longer be able to access the storage device 170 with identifier SN1. As such, the correction advantageously avoids the error.

Note that a server $105_1$ may be configured to indicate an error in the event it cannot access the storage device 170 with identifier SN1, e.g., when server $105_1$ is powered up. Therefore, if the storage device 170 with identifier SN1 is misplaced in storage-device location $160_6$ assigned to server $105_2$, server $105_1$ will not be able access the misplaced storage device 170 with identifier SN1 and will indicate an error. By reassigning storage-device location $160_6$ to server $105_1$, the error is avoided, in that server $105_1$ will be able access the storage device 170 with identifier SN1, e.g., upon power up.

For some embodiments, an indication of the illegal storage device movement may be sent to interface 187 from zone manager 180. For example, zone manager 180 may send a signal to interface 187 that is indicative that the storage device 170 with identifier SN1 was inserted into a storage-device location assigned to a different zone group, and thus a different server, than the identifier SN1.

An indication that the illegal storage device movement was corrected may also be sent to interface 187 from zone manager 180. For example, zone manager 180 may send a signal to interface 187 that is indicative that storage-device location $160_6$ was assigned to the same zone group, and thus the same server, as identifier SN1. For example, when a user accesses interface 187 with computer 188, the indication of the illegal storage device movement and the correction thereof may display.

For some embodiments, zone manager 180 may assign storage-device location $160_6$ to zone group ZG1, and thus to server $105_1$, by instructing expander 120 to couple the I/O port 140 coupled to storage-device location $160_6$ to server $105_1$. For example, expander 120 may switch the I/O port 140 coupled to storage-device location $160_6$ from being coupled to server $105_2$ to be coupled to server $105_1$.

In response to assigning storage-device location $160_6$ to zone group ZG1, and thus to server $105_1$, zone manager 180 may update the state of Table 1, e.g., to produce Table 2, to correspond to the configuration of storage array 150 shown in the example of FIG. 2B. That is, zone manager 180 may update Table 1 in response to storage-device location $160_6$ and the storage device 170 with the identifier SN1, and thus the identifier SN1, being assigned to the same zone group ZG1, and thus to the same server $105_1$. For example, Table 2 shows an example of Table 192 corresponding to the configuration of storage array 150 shown in FIG. 2B.

TABLE 2

| Zone Group | Server | Storage-Device Locations | Storage-Device Identifiers |
|---|---|---|---|
| ZG1 | $105_1$ | (~~$160_1$~~) $160_6$, $160_2$, $160_3$, $160_4$, $160_9$ | SN1, SN2, SN4, SN9 |
| ZG2 | $105_2$ | $160_5$, (~~$160_6$~~) $160_7$, $160_8$, $160_{12}$ | SN5, SN7, SN8, SN12 |

In the example of Table 2, zone manager 180 has deleted storage-device location $160_1$ from zone group ZG1, deleted storage-device location $160_6$ from zone group ZG2, and added storage-device location $160_6$ to zone group ZG1. In other words, zone manager 180 has moved storage-device location $160_6$ from zone group ZG2 to zone group ZG1. Note that the storage device 170 with the identifier SN1 remains assigned to zone group ZG1.

The foregoing example, presented in conjunction with FIGS. 2B and 3 and Table 2, illustrates how the zone manager 180, and thus I/O system 100, handles the situation where a storage device 170 that is being tracked by its identifier, e.g., the identifier present in table 192 (e.g., in Table 1), is inserted into a storage-device location 160 that is assigned to a different zone group and thus a different server. In particular, the example illustrates how the zone manager 180 handles the situation when a storage device that is being tracked by its identifier is removed from a storage-device location that is already assigned to a zone group and is inserted into a storage-device location that is already assigned to another zone group. Note that zone manager 180 might not act in response to the removal of the storage device from a storage-device location 160, but instead may act in response to the storage device being inserted into another storage-device location 160.

Figure 2C:
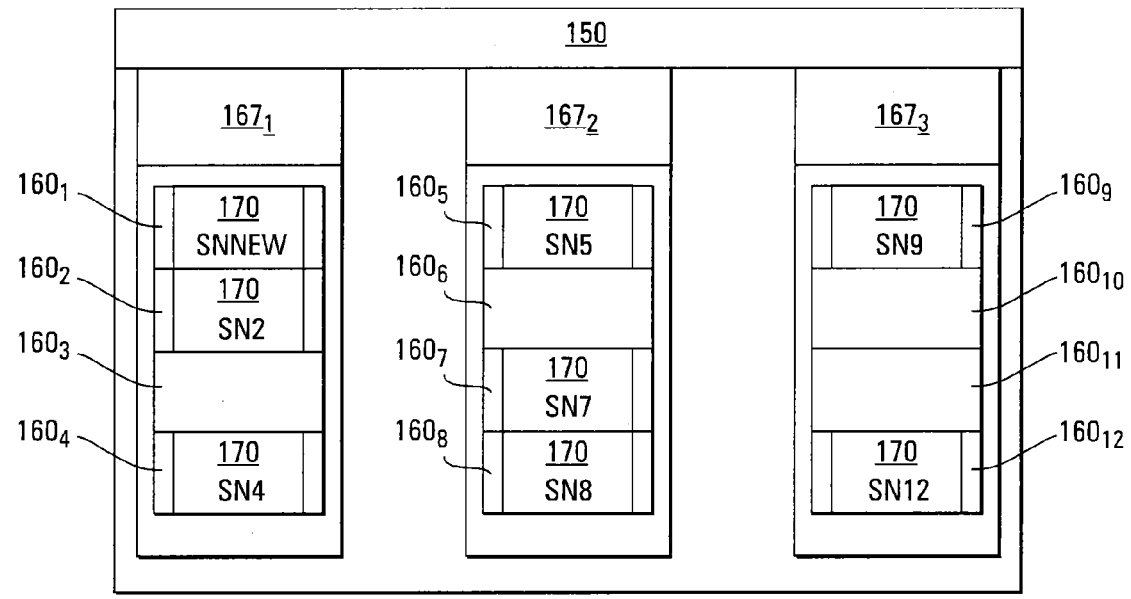

The example of FIG. 2C, illustrates the configuration of storage array 150 after the storage device 170 with identifier SN1 is removed from storage-device location $160_1$ in FIG. 2A (corresponding to Table 1) and is replaced by an untracked, new storage device 170 with an identifier SNNEW that is not in Table 1. That is, the untracked, new storage device 170 with an identifier SNNEW is inserted into a storage-device location 160, e.g., storage-device location $160_1$, that is assigned to a server, e.g., server $105_1$. Zone manager 180 may not act in response to the removal of the storage device 170 with identifier SN1, but instead may act in response to the storage device 170 with the identifier SNNEW being inserted into the storage-device location $160_1$ that is assigned to server $105_1$.

Zone manager 180 may update the state of Table 1, e.g., to produce Table 3, to correspond to the configuration of storage array 150 shown in the example of FIG. 2C in response to the storage device 170 with the identifier SNNEW being inserted in storage-device location $160_1$. For example, Table 3 is an example of table 192 corresponding to the configuration of storage array 150 shown in FIG. 2C.

TABLE 3

| Zone Group | Server | Storage-Device Locations | Storage-Device Identifiers |
|---|---|---|---|
| ZG1 | $105_1$ | $160_1$, $160_2$, $160_3$, $160_4$, $160_9$ | ~~SN1~~ SN1 SNNEW, SN2, SN4, SN9 |
| ZG2 | $105_2$ | $160_5$, $160_6$, $160_7$, $160_8$, $160_{12}$ | SN5, SN7, SN8, SN12 |

In response to the storage device 170 with the identifier SNNEW being inserted in storage-device location $160_1$, zone manager 180 may remove the identifier SN1 of the storage device 170 that is being replaced by the storage device 170 with the identifier SNNEW from Table 1 (e.g., as indicated in Table 3) and may add the identifier SNNEW to the zone group ZG1 to which server $105_1$ is assigned and that includes the storage-device location $160_1$ into which the storage device 170 with the identifier SNNEW is inserted. For example, zone manager 180 may assign the storage device 170 with the identifier SNNEW to server $105_1$ and may start tracking the storage device 170 with the identifier SNNEW. This may be indicated to interface 187 and thus to a user accessing interface 187, e.g., with computer 188.

For example, in response to the storage device 170 with identifier SNNEW being inserted in storage-device location $160_1$, a signal may be sent from storage array 150 to zone manager 180, e.g., via expander 120 (e.g., a broadcast event). In response to receiving the signal, zone manager 180 may retrieve (e.g., a discovery process) the identifier SNNEW from the storage device 170 and the storage-device location $160_1$ into which storage device 170 with identifier SNNEW is inserted from array 150.

Zone manager 180 may then enter Table 1 with the retrieved identifier SNNEW and the retrieved storage-device location $160_1$. Zone manager 180 may then retrieve the server $105_1$ corresponding to storage-device location $160_1$ from Table 1 and may determine from Table 1 that the storage device 170 with the identifier SNNEW is new and untracked, e.g., due to the absence of the identifier SNNEW from Table 1.

In response to determining that identifier SNNEW is new and untracked and that the storage device 170 with identifier SNNEW is in storage-device location $160_1$ that belongs to the zone group ZG1 to which server $105_1$ is assigned, zone manager 180 may then assign the storage device 170 with the identifier SNNEW to server $105_1$ by adding the storage device 170 with the identifier SNNEW to zone group ZG1 and may start tracking the storage device 170 with the identifier SNNEW. Zone manager 180 may then update Table 1, in response to assigning the storage device 170 with the identifier SNNEW to zone group ZG1 and server $105_1$, to produce Table 3 that reflects that the storage device 170 with the identifier SNNEW is in zone group ZG1 and is assigned to server $105_1$.

The foregoing example presented in conjunction with FIG. 2C and Table 3, illustrates how the zone manager handles the situation when a new, untracked storage device 170 replaces a tracked storage device 170.

Figure 2D:
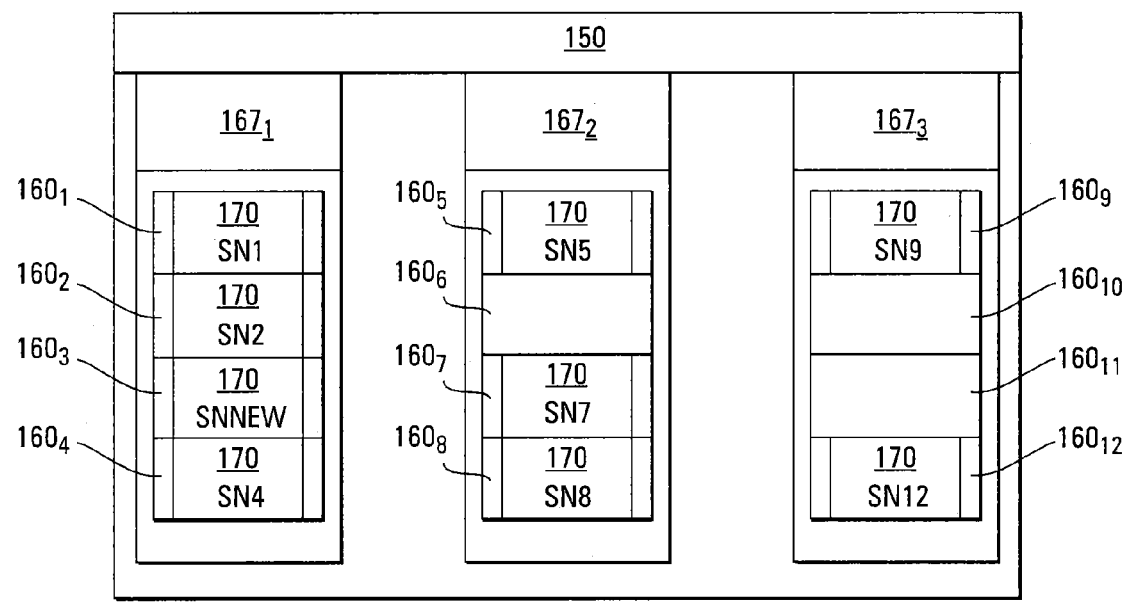

The example of FIG. 2D, illustrates the configuration of storage array 150 after a new, untracked storage device 170 with an identifier SNNEW is inserted into an empty storage-device location 160 (e.g., storage-device location $160_3$) that did not previously contain a storage device and that is assigned to a zone group, e.g., zone group ZG1 and thus server $105_1$.

Zone manager 180 may update the state of Table 1, e.g., to produce Table 4, to correspond to the configuration of storage array 150 shown in the example of FIG. 2D in response to the storage device 170 with the identifier SNNEW being inserted in storage-device location $160_3$. For example, Table 4 is an example of table 192 corresponding to the configuration of storage array 150 shown in FIG. 2D.

TABLE 4

| Zone Group | Server | Storage-Device Locations | Storage-Device Identifiers |
|---|---|---|---|
| ZG1 | $105_1$ | $160_1$, $160_2$, $160_3$, $160_4$, $160_9$ | SN1 SN2, SNNEW, SN4, SN9 |
| ZG2 | $105_2$ | $160_5$, $160_6$, $160_7$, $160_8$, $160_{12}$ | SN5, SN7, SN8, SN12 |

In response to the storage device 170 with the identifier SNNEW being inserted in storage-device location $160_3$, zone manager 180 may add the identifier SNNEW to the zone group ZG1 that includes the storage-device location $160_3$ into which the storage device 170 with the identifier SNNEW is inserted. For example, zone manager 180 may assign the storage device 170 with the identifier SNNEW to zone group ZG1, and thus to server $105_1$, and may start tracking the storage device 170 with the identifier SNNEW. This may be indicated to interface 187 and thus to a user accessing interface 187, e.g., with computer 188.

For example, in response to the storage device 170 with identifier SNNEW being inserted in storage-device location $160_3$, a signal may be sent from storage array 150 to zone manager 180, e.g., via expander 120, (e.g., a broadcast event). In response to receiving the signal, zone manager 180 may retrieve the identifier SNNEW from the storage device 170 and retrieve the storage-device location $160_3$ into which the storage device 170 with identifier SNNEW is inserted from array 150 (e.g., a discovery process).

Zone manager 180 may then enter Table 1 with the retrieved identifier SNNEW and the retrieved storage-device location $160_3$. Zone manager 180 may then retrieve the server $105_1$ belonging the zone group ZG1 and corresponding to storage-device location $160_3$ from Table 1 and may determine from Table 1 that the storage device 170 with the identifier SNNEW is new and untracked, e.g., due to the absence of the identifier SNNEW from Table 1.

In response to determining that identifier SNNEW is new and untracked and that the storage device 170 with identifier SNNEW is in storage-device location $160_3$, which belongs to zone group ZG1, zone manager 180 may assign the storage device 170 with identifier SNNEW to zone group ZG1, and thus server $105_1$, by adding the storage device 170 with the identifier SNNEW to zone group ZG1 and may start tracking the storage device 170 with the identifier SNNEW. Zone manager 180 may then update Table 1, in response to the storage device 170 with the identifier SNNEW being assigned to zone group ZG1 and server $105_1$, to produce Table 4 that reflects that the storage device 170 with the identifier SNNEW is added to zone group ZG1 and is thus assigned to zone group ZG1 and server $105_1$.

The foregoing example presented in conjunction with FIG. 2D and Table 4 illustrates how the zone manager handles the situation when a new, untracked storage device 170 is inserted into an empty storage-device location 160 that did not previously contain a storage device and that is assigned to a particular zone group, and thus a particular server.

Figure 2E:
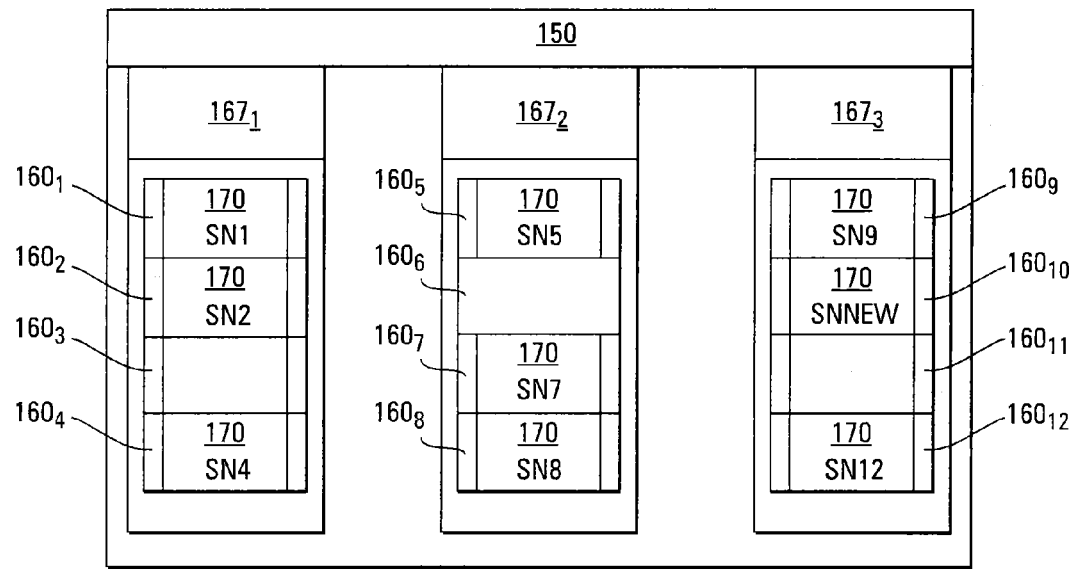

The example of FIG. 2E, illustrates the configuration of storage array 150 after a new, untracked storage device 170 with an identifier SNNEW is inserted into a storage-device location 160, e.g., storage-device location $160_{10}$, that is not assigned to a zone group and thus a server. For example, FIG. 2E, illustrates the configuration of storage array 150 after a new, untracked storage device 170 with an identifier SNNEW is inserted into array 150 having the configuration of FIG. 2A, corresponding to Table 1. In response, to determining that the storage device 170 with identifier SNNEW is new and untracked and that storage-device location $160_{10}$ does not belong to a zone group, zone manager 180 may determine that storage-device location $160_{10}$ is not to be assigned to a zone group, and thus a server, and the storage device 170 with identifier SNNEW is not to be tracked.

For example, in response to the storage device 170 with identifier SNNEW being inserted in storage-device location $160_{10}$, a signal may be sent from storage array 150 to zone manager 180, e.g., via expander 120 (e.g., a broadcast event). In response to receiving the signal, zone manager 180 may retrieve the identifier SNNEW from the storage device 170 and the storage-device location $160_{10}$ into which the storage device 170 with identifier SNNEW is inserted from array 150 (e.g., a discovery process).

Zone manager 180 may then enter Table 1 with the retrieved identifier SNNEW and the retrieved storage-device location $160_{10}$. Zone manager 180 may then determine from Table 1 that storage-device location $160_{10}$ does not belong to a zone group, and thus a server, due to the absence of storage-device location $160_{10}$ from Table 1. Zone manager 180 may further determine from Table 1 that the storage device 170 with the identifier SNNEW is new and untracked due to the absence of the identifier SNNEW from Table 1. In response to determining that identifier SNNEW is new and untracked and in response to determining that storage-device location $160_{10}$ does not belong to a zone group, and thus is not assigned to a server, zone manager 180 may determine that the storage device 170 with the identifier SNNEW is not to be added to a zone group or assigned to a server and is not to be tracked.

Figure 2F:
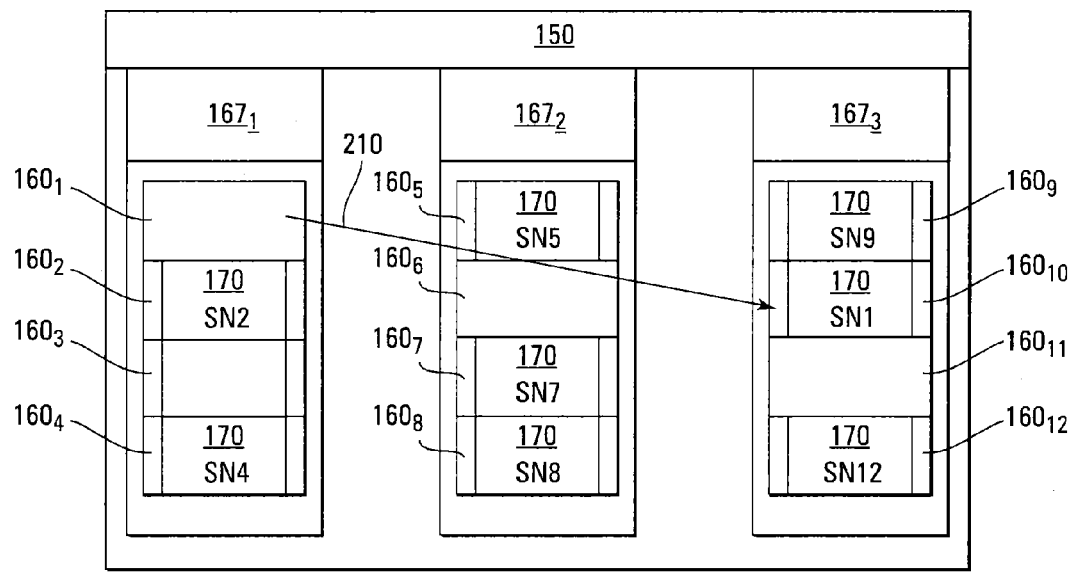

In the example of FIG. 2F, the storage device 170 with identifier SN1 is moved from storage-device location $160_1$ of storage array 150 (as configured in FIG. 2A, corresponding to Table 1) to the empty storage-device location $160_{10}$, as indicated by arrow 210, where storage-device location $160_{10}$ is not assigned to a zone group and thus is not assigned to a server. In response to the storage device 170 with identifier SN1 being inserted into storage-device location $160_{10}$, zone manager 180 may remove storage-device location $160_1$ that previously contained the storage device 170 with identifier SN1 from zone group ZG1, e.g. so that storage-device location $160_1$ is no longer assigned to server $105_1$, and may add storage-device location $160_{10}$ that now contains the storage device 170 with identifier SN1 to zone group ZG1, e.g., so that storage-device location $160_{10}$ is now assigned to server $105_1$. This may be indicated to interface 187 and thus to a user accessing interface 187, e.g., with computer 188. Zone manager 180 might not act in response to the removal of the storage device 170 with identifier SN1, but instead may act in response to the storage device 170 with the identifier SN1 being inserted into the storage-device location $160_{10}$.

Zone manager 180 may update the state of Table 1, e.g., to produce Table 5, to correspond to the configuration of storage array 150 shown in the example of FIG. 2F in response to the storage device 170 with the identifier SN1 being inserted in storage-device location $160_{10}$. For example, zone manager 180 may delete storage-device location $160_1$ from zone group ZG1, e.g. so that storage-device location $160_1$ is no longer assigned to server $105_1$, and add storage-device location $160_{10}$ to zone group ZG1, e.g., so that storage-device location $160_{10}$ is now assigned to server $105_1$, as shown in Table 5. Note that Table 5 is an example of table 192 corresponding to the configuration of storage array 150 shown in FIG. 2F.

TABLE 5

| Zone Group | Server | Storage-Device Locations | Storage-Device Identifiers |
|---|---|---|---|
| ZG1 | $105_1$ | (~~$160_1$~~) $160_{10}$, $160_2$, $160_3$, $160_4$, $160_9$ | SN1, SN2, SN4, SN9 |
| ZG2 | $105_2$ | $160_5$, $160_6$ $160_7$, $160_8$, $160_{12}$ | SN5, SN7, SN8, SN12 |

For example, a signal may sent from storage array 150 to zone manager 180, e.g., over the link 165 corresponding storage-device location $160_{10}$ via expander 120, in response to the storage device 170 with the identifier SN1 being inserted into the storage-device location $160_{10}$ (e.g., a broadcast event). In response to receiving the signal, zone manager 180 may retrieve the identifier SN1 from the storage device 170 with the identifier SN1 and may retrieve the storage-device location $160_{10}$ into which the storage device 170 with the identifier SN1 is inserted from array 150 (e.g., a discovery process).

Zone manager 180 may then enter Table 1 with the retrieved identifier SN1 and the retrieved storage-device location $160_{10}$. Zone manager 180 may then determine from Table 1 that the identifier SN1 is assigned to zone group ZG1, and thus server $105_1$, and that the storage-device location $160_{10}$ is not assigned to a zone group, and thus a server, due to the absence of storage-device location $160_{10}$ from Table 1.

Zone manager 180 may then assign storage-device location $160_{10}$ to zone group ZG1, and thus server $105_1$, in response to determining that the identifier SN1 is assigned to zone group ZG1, and thus server $105_1$, and that the storage device 170 with the identifier SN1 is inserted into storage-device location $160_{10}$. Zone manager 180 may then update Table 1, in response to assigning storage-device location $160_{10}$ to zone group ZG1, and thus server $105_1$, to produce Table 5 that reflects that the storage-device location $160_1$ has been removed from zone group ZG1 and that storage-device location $160_{10}$ has been added to zone group ZG1.

The foregoing example presented in conjunction with FIG. 2F and Table 5, illustrates how the zone manager handles the situation when a tracked storage device 170 that is assigned to a zone group and to a server is inserted into a storage-device location 160 that is not assigned to a zone group or a server.

Figure 2G:
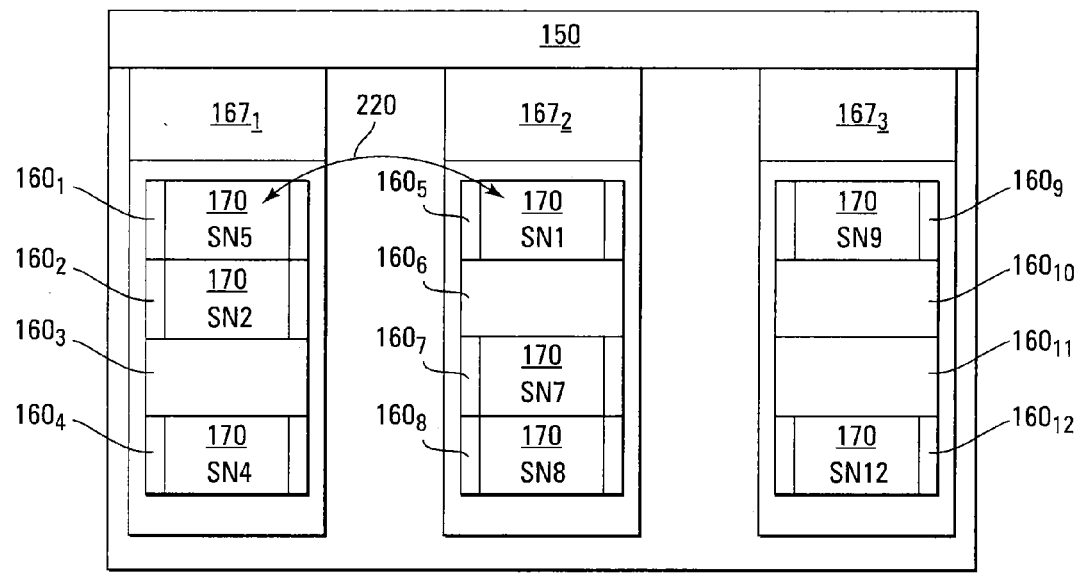

In the example of FIG. 2G, the storage device 170 with identifier SN1 is swapped with the storage device 170 with identifier SN5, as indicated by arrow 220. That is, the storage device 170 with identifier SN1 and the storage device 170 with identifier SN5 are respectively removed from storage-device location $160_1$ and storage-device location $160_5$ in FIG. 2A. Note that FIG. 2A shows array 150 before the swap and Table 1 corresponds to a state before the swap. The storage device 170 with identifier SN1 is then inserted into storage-device location $160_5$ and the storage device 170 with identifier SN5 is then inserted into storage-device location $160_1$ in FIG. 2G.

Zone manager 180 might not act in response to the removal of the storage device 170 with identifier SN1 and the removal of the storage device 170 with identifier SN5, but instead may act in response to the storage device 170 with the identifier SN1 being inserted into the storage-device location $160_5$ and the storage device 170 with the identifier SN5 being inserted into the storage-device location $160_1$.

Zone manager 180 may update the state of Table 1, e.g., to produce Table 6, to correspond to the configuration of storage array 150 shown in the example of FIG. 2G in response to the storage device 170 with the identifier SN1 being inserted in storage-device location $160_5$ and the storage device 170 with the identifier SN5 being inserted in storage-device location $160_1$. For example, zone manager 180 may delete storage-device location $160_1$ from zone group ZG1 so that storage-device location $160_1$ is no longer assigned to server $105_1$ and may add storage-device location $160_1$ to zone group ZG2, e.g., the zone group to which the storage device 170 with the identifier SN5 belongs, so that storage-device location $160_1$ is assigned to server $105_2$, as shown in Table 6.

Zone manager 180 may further delete storage-device location $160_5$ from zone group ZG2 so that storage-device location $160_5$ is no longer assigned to server $105_2$ and may add storage-device location $160_5$ to zone group ZG1, e.g., the zone group to which the storage device 170 with the identifier SN1 belongs, so that storage-device location $160_5$ is assigned to server $105_1$. In other words, zone manager 180 swaps the zone groups, and thus the servers, for storage-device locations $160_1$ and $160_5$. Note that Table 6 is an example of table 192 corresponding to the configuration of storage array 150 shown in FIG. 2G.

TABLE 6

| Zone Group | Server | Storage-Device Locations | Storage-Device Identifiers |
|---|---|---|---|
| ZG1 | $105_1$ | (~~$160_1$~~) $160_5$, $160_2$, $160_3$, $160_4$, $160_9$ | SN1, SN2, SN4, SN9 |
| ZG2 | $105_2$ | (~~$160_5$~~) $160_1$ $160_6$, $160_7$, $160_8$, $160_{12}$ | SN5, SN7, SN8, SN12 |

In response to the storage device 170 with identifier SN1 being inserted in storage-device location $160_5$, a signal may be sent from storage array 150 to zone manager 180, e.g., via expander 120, (e.g., a broadcast event). In response to receiving the signal, zone manager 180 may then retrieve identifier SN1 from the storage device 170 with identifier SN1 and the storage-device location $160_5$ from array 150 (e.g., a discovery process). Zone manager 180 may then enter Table 1 with the retrieved identifier SN1 and the storage-device location $160_5$.

Zone manager 180 may then determine the zone group and the server corresponding to identifier SN1 (in this case zone group ZG1 and thus server $105_1$) and the zone group and the server corresponding to the storage-device location $160_5$ (in this case zone group ZG2 and thus server $105_2$) from Table 1. Zone manager 180 may then compare the zone groups, and thus the servers, thus obtained to determine whether the zone group, and thus the server, corresponding to storage-device location $160_5$ and the zone group, and thus the server, corresponding to identifier SN1 are the same or different. For example, this may be referred to as tracking the storage device 170 with identifier SN1. The comparison of the zone groups, and thus the servers, thus obtained reveals that storage-device location $160_5$ and identifier SN1 are assigned to different zone groups, and thus different servers, i.e., respectively to zone groups ZG2 and ZG1 and thus servers $105_2$ and $105_1$. For example, this may be referred to as detecting an illegal movement of the storage device 170 with identifier SN1.

Therefore, zone manager 180 may assign storage-device location $160_5$ to zone group ZG1, and thus server $105_1$, in response to determining that storage-device location $160_5$ and the identifier SN1 are assigned to different zone groups and servers. For example, this may be referred to as correcting the illegal movement of the storage device 170 with identifier SN1. Zone manager 180 may send a signal to interface 187 indicative of the detection of the illegal movement of the storage device 170 with identifier SN1 and the correction of the illegal movement, e.g., indicative of the assignment of storage-device location $160_5$ to zone group ZG1 and thus server $105_1$.

In response to the storage device 170 with identifier SN5 being inserted in storage-device location $160_1$, a signal may be sent from storage array 150 to zone manager 180, e.g., via expander 120, (e.g., a broadcast event). In response to receiving the signal, zone manager 180 may then retrieve identifier SN5 from the storage device 170 with identifier SN5 and the storage-device location $160_1$ from array 150 (e.g., a discovery process). Zone manager 180 may then enter Table 1 with the retrieved identifier SN5 and the retrieved storage-device location $160_1$.

Zone manager 180 may then determine the zone group, and thus the server, corresponding to identifier SN5 (in this case zone group ZG2 and thus server $105_2$) and the zone group, and thus the server, corresponding to the storage-device location $160_1$ (in this case zone group ZG1 and thus server $105_1$) from Table 1. Zone manager 180 may then compare the zone groups, and thus the servers, thus obtained to determine whether the zone group, and thus the server, corresponding to storage-device location $160_1$ and the zone group, and thus the server, corresponding to identifier SN5 are the same or different. For example, this may be referred to as tracking the storage device 170 with identifier SN5. The comparison of the zone groups, and thus the servers, thus obtained reveals that storage-device location $160_1$ and the identifier SN5 are assigned to different zone groups and thus different servers, i.e., respectively to zone groups ZG1 and ZG2 and thus servers $105_1$ and $105_2$. For example, this may be referred to as detecting an illegal movement of the storage device 170 with identifier SN5.

Therefore, zone manager 180 may assign storage-device location $160_1$ to zone group ZG2, and thus server $105_2$, in response to determining that that storage-device location $160_1$ and the identifier SN5 are assigned to different zone groups, and thus different servers. For example, this may be referred to as correcting the illegal movement of the storage device 170 with identifier SN5. Zone manager 180 may send a signal to interface 187 indicative of the detection of the illegal movement of the storage device 170 with identifier SN5 and the correction of the illegal movement, e.g., indicative of the assignment of storage-device location $160_1$ to zone group ZG2 and thus server $105_2$.

For some embodiments, when a storage device 170 is moved to a storage location 160 that is assigned to the same zone group, and thus the same server, as the storage device 170, zone manager 180 may leave table 192 unaltered, in that the storage device 170 remains in a zone group including the server 105 that has access rights to the storage device 170.

Figure 2H:
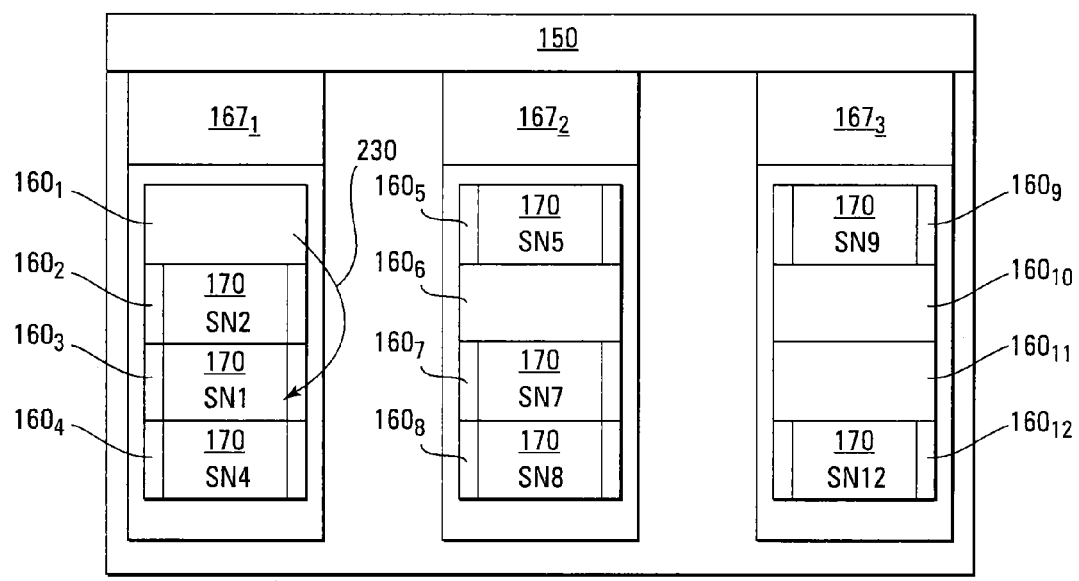

For example, in the example of FIG. 2H, the storage device 170 with identifier SN1 is moved from storage-device location $160_1$ of storage array 150 (as configured in FIG. 2A, corresponding to Table 1) to the previously empty storage-device location $160_3$, as indicated by arrow 230, where storage-device location $160_3$ is assigned to the same zone group ZG1, and thus the same server $105_1$, as the storage device 170 with identifier SN1.

For example, a signal may sent from storage array 150 to zone manager 180, e.g., via expander 120, in response to the storage device 170 with the identifier SN1 being inserted into the storage-device location $160_3$ (e.g., a broadcast event). In response to receiving the signal, zone manager 180 may retrieve identifier SN1 from the storage device 170 and may retrieve the storage-device location $160_3$ into which the storage device 170 with the identifier SN1 is inserted from array 150 (e.g., a discovery process).

Zone manager 180 may then enter Table 1 with the retrieved identifier SN1 and the retrieved storage-device location $160_3$. Zone manager 180 may then determine that identifier SN1 and the storage-device location $160_3$ are assigned to the same zone group ZG1, and thus the same server $105_1$, from Table 1. For example, this may be referred to as tracking the storage device 170 with the identifier SN1. In this example, the tracking reveals no illegal movement of the storage device 170 with the identifier SN1, in that the storage device 170 with the identifier SN1 is moved to a storage-device location that is assigned to the same zone group, and thus the same server, as the identifier SN1. As such, no modifications are made to Table 1.

For other embodiments, switch 115 (FIG. 1) may be integrated in array 150. That is, array 150 may include expander 120 and zone manager 180.

For further embodiments, all the storage-device locations 160, and thus the storage devices 170, of array 150 may be communicatively coupled to a single expander (not shown) in array 150 that is communicatively coupled to expander 120 by links 165 and that is located between the storage-device locations 160, and thus the storage devices 170, and expander 120.

In some embodiments, each of enclosures $167_1$ to $167_M$ may include an expander (not shown) between its storage-device locations 160, and thus its storage devices 170, and expander 120 for communicatively coupling the respective storage-device locations 160 and storage devices 170 to expander 120. For example, enclosure $167_1$ may include an expander communicatively coupled to storage-device locations $160_1$ to $160_I$ and communicatively coupled to ports $140_1$ to $140_I$ of expander 120 by links $165_1$ to $165_I$; enclosure $167_2$ may include an expander communicatively coupled to storage-device locations $160_{I+1}$ to $160_{I+J}$ and communicatively coupled to ports $140_{I+1}$ to $140_{I+J}$ of expander 120 by links $165_{I+1}$ to $165_{I+J}$; and enclosure $167_M$ may include an expander communicatively coupled to storage-device locations $160_{I+J+1}$ to $160_{I+J+L}$ and communicatively coupled to ports $140_{I+J+1}$ to $140_{I+J+L}$ of expander 120 by links $165_{I+J+1}$ to $165_{I+J+L}$.

For other embodiments, expander 120 may be omitted; each of enclosures $167_1$ to $167_M$ may include an expander (not shown); and zone manager 180 may be directly coupled to the expander of one of enclosures $167_1$ to $167_M$. For example, the expander of enclosure $167_1$ may selectively couple storage-device locations $160_1$ to $160_I$ to servers $105_1$ to $105_N$; the expander of enclosure $167_2$ may selectively couple storage-device locations $160_{I+1}$ to $160_{I+J}$ to servers $105_1$ to $105_N$; and the expander of enclosure $167_M$ may selectively couple storage-device locations $160_{I+J+1}$ to $160_{I+J+L}$ to servers $105_1$ to $105_N$. The one expander directly coupled to zone manager 180 would then be coupled to the remaining expanders of the remaining enclosures so that zone manager 180 could control (switch) the expander directly coupled thereto and control (switch) the remaining expanders via the expander directly coupled to zone manager 180.

Although specific embodiments have been illustrated and described herein it is manifestly intended that the scope of the claimed subject matter be limited only by the following claims and equivalents thereof.

What is claimed is:

1. A method of operating a zone manager of an input/output system, comprising:
   in response to a storage device being inserted into a particular storage-device location of the input/output system, determining whether the particular storage-device location and the storage device are assigned to a same server of the input/output system; and
   assigning the particular storage-device location and storage device to the same server in response to determining that the particular storage-device location and the storage device are not assigned to the same server.

2. The method of claim 1, wherein determining that the particular storage-device location and the storage device are not assigned to the same server comprises determining that the storage device is not assigned to any server of the input/output system and determining that the particular storage-device location is assigned to a server of the input/output system.

3. The method of claim 1, wherein determining that the particular storage-device location and the storage device are not assigned to the same server comprises determining that the storage-device location is not assigned to any server of the input/output system and determining that the storage device is assigned to a server of the input/output system.

4. The method of claim 1, further comprising, in response to assigning the particular storage-device location and storage device to the same server, updating storage of the zone manager to reflect that the particular storage-device location and storage device are assigned to the same server.

5. The method of claim 1, further comprising indicating to a user interface that the particular storage-device location and storage device have been assigned to the same server.

6. The method of claim 1, wherein determining whether the particular storage-device location and the storage device are assigned to the same server comprises:
   using a table to determine a server to which the storage-device location is assigned and to determine a server to which the storage device is assigned; and
   comparing the server to which the storage-device location is assigned to the server to which the storage device is assigned.

7. A method of operating a zone manager of a service delivery system, comprising:
   receiving a signal in response to a storage device being inserted into a particular storage-device location of an array of storage-device locations;
   retrieving the storage-device location from the array of storage-device locations and an identifier of the storage device from the storage device in response to receiving the signal;
   using the identifier to determine a zone group to which the identifier is assigned;
   using the storage-device location to determine a zone group to which the storage-device location is assigned;
   comparing the zone group to which the identifier is assigned to the zone group to which the storage-device location is assigned; and
   if the zone group to which the identifier is assigned does not match the zone group to which the storage-device location is assigned, assigning the storage-device location to the zone group to which the identifier is assigned.

8. The method of claim 7, further comprising sending a signal to a user interface indicative that the storage-device location has been assigned to the zone group to which the identifier is assigned.

9. The method of claim 7, wherein using the identifier to determine the zone group to which the identifier is assigned comprises determining the zone group to which the identifier is assigned from a table in response entering the table with the identifier, and wherein using the storage-device location to determine the zone group to which the storage-device location is assigned comprises determining the zone group to which the storage-device location is assigned from the table in response entering the table with the storage-device location.

10. A service delivery system, comprising:
    a controller;
    wherein the controller is configured to keep track of whether an identifier of a storage device and a storage-device location into which the storage device is inserted are assigned to a same server of a plurality of servers; and
    wherein the controller is configured to assign the identifier of the storage device and the storage-device location into which the storage device is inserted to the same server in response to determining that the identifier of the storage device and the storage-device location are not assigned to the same server.

11. The service delivery system of claim 10, further comprising a look-up table that at least contains identifiers of storage devices tabulated against servers of the plurality of servers.

12. The service delivery system of claim 11, wherein the controller is configured to update the look-up table to reflect that the identifier of storage device and the storage-device location into which the storage device is inserted are assigned to the same server in response to determining that the identifier of the storage device and the storage device location are not assigned to the same server.

13. The service delivery system of claim 10, further comprising a user interface coupled to the controller, wherein the controller is configured to indicate to the user interface, in response to determining that the identifier of the storage device and storage-device location are not assigned to the same server, that illegal movement of the storage device has occurred, and wherein the controller is configured to indicate to the user interface, in response to assigning the identifier of storage device and the storage-device location into which the storage device is inserted to the same server, that the illegal movement of the storage device has been corrected.

14. The service delivery system of claim 10, further comprising an expander coupled to the controller and configured to selectively couple storage device locations, including the storage-device location into which the storage device is inserted, to the plurality of servers.

15. The service delivery system of claim 10, wherein the controller is configured to retrieve the identifier of the storage device from the storage device and to retrieve the storage-device location from an array of storage-device locations, that comprises the storage-device location into which the storage device is inserted, in response to receiving a signal from the array of storage-device locations.

* * * * *